(12) United States Patent
Abe et al.

(10) Patent No.: US 8,552,845 B2
(45) Date of Patent: Oct. 8, 2013

(54) VEHICLE BURGLAR ALARM CIRCUIT

(75) Inventors: Yutaka Abe, Miieken wataraigun (JP);
Keizo Nishikawa, Miieken wataraigun (JP)

(73) Assignee: Panasonic Corporation, Osaka (JP)

( * ) Notice: Subject to any disclaimer, the term of this patent is extended or adjusted under 35 U.S.C. 154(b) by 185 days.

(21) Appl. No.: 13/090,466

(22) Filed: Apr. 20, 2011

(65) Prior Publication Data

US 2011/0260844 A1    Oct. 27, 2011

(30) Foreign Application Priority Data

Apr. 23, 2010   (JP) .................................. 2010-100258

(51) Int. Cl.
   *G08B 3/10*    (2006.01)
   *B60R 25/10*   (2006.01)
   *H02M 7/538*   (2007.01)

(52) U.S. Cl.
   USPC ............... 340/384.6; 307/10.2; 340/426.1; 363/133

(58) Field of Classification Search
   None
   See application file for complete search history.

(56) References Cited

U.S. PATENT DOCUMENTS

| | | | | |
|---|---|---|---|---|
| 3,164,784 A | * | 1/1965 | Jennings | 331/113 A |
| 3,217,239 A | * | 11/1965 | Lunney | 323/258 |
| 3,769,571 A | * | 10/1973 | Wilkinson | 363/134 |
| 4,008,427 A | * | 2/1977 | Johnson | 363/37 |
| 4,189,718 A | * | 2/1980 | Carson et al. | 340/384.4 |
| 6,833,635 B2 | * | 12/2004 | Kippley | 307/83 |
| 2006/0092677 A1 | * | 5/2006 | Moussaoui et al. | 363/71 |
| 2006/0170536 A1 | * | 8/2006 | Yu et al. | 340/426.1 |

FOREIGN PATENT DOCUMENTS

JP    2005-215544    8/2005

* cited by examiner

*Primary Examiner* — Steven Lim
*Assistant Examiner* — Stephen Burgdorf
(74) *Attorney, Agent, or Firm* — Bacon & Thomas, PLLC

(57) ABSTRACT

A vehicle burglar alarm circuit includes a transformer having first to fourth taps, a center tap provided at a center point and output taps, wherein the number of coil turns between the first and second taps is greater than the number of coil turns between the third and fourth taps; and output taps connected with a sounding body. The circuit further includes a first and second power sources connected to the center tap, the second power source outputting a lower output voltage; a sounding body driving unit having first to fourth driving switches respectively connected to the first to fourth taps; and a controller which controls the sounding body driving unit. The first and second driving switches are alternately turned on/off when using the first power source, and the third and fourth driving switches are alternately turned on/off when using the second power source.

7 Claims, 3 Drawing Sheets

VEHICLE BURGLAR ALARM CIRCUIT

FIELD OF THE INVENTION

The present invention relates to a vehicle burglar alarm circuit.

BACKGROUND OF THE INVENTION

With recent increase in the number of crimes such as car thefts, thefts from cars and the like, it has been widely popularized to install a burglar alarm device in a vehicle to sound an alarm by detecting abnormal conditions of the vehicle (e.g., the invasion of criminals on vehicles, the breakage of car windows or stealing by a wrecker) (see, e.g., Japanese Patent Application Publication No. 2005-215544).

A burglar, however, can disable a vehicle burglar alarm device by separating a main battery from the alarm device. For that reason, there has been disclosed a vehicle burglar alarm device capable of sounding an alarm by using an internal battery provided inside the alarm device, even when the main battery is separated from the alarm device.

FIG. 3 is a block diagram showing a conventional vehicle burglar alarm circuit provided in a vehicle burglar alarm device.

The conventional vehicle burglar alarm circuit includes a main battery 11, an internal battery 12, a DC/DC converter 13, a driving circuit 14 and a sounding body 15.

The main battery 11 includes a lead rechargeable battery loaded in a vehicle. In this conventional case, an output voltage V11 of the main battery 11 is a DC voltage of 12V. The internal battery 12 includes a Ni-MH battery, a lithium battery or the like. In this conventional case, an output voltage V12 of the internal battery 12 is a DC voltage ranging from 4.8 V to 6.0 V. Further, the DC/DC converter 13 employs the main battery 11 as an input power source when the main battery 11 is loaded, and employs the internal battery 12 as an input power source when the main battery 11 is separated. Further, there is provided a switch SW including a semiconductor device such as a field-effect transistor (FET), a transistor or the like for turning on and off a power supplied from the main battery 11 to the DC/DC converter 13.

The DC/DC converter 13 is of a flyback type and configured such that a boosting (step-up) ratio of an output voltage to an input voltage is variable. Further, the DC/DC converter 13 boosts the output voltage V11 and the output voltage V12 having different voltage values at different ratios to output a constant output voltage V13. In the conventional case, the output voltage V13 of the DC/DC converter 13 is a DC voltage of 40 V.

The driving circuit 14 includes four transistors (not shown). Further, the driving circuit 14 generates a high frequency output voltage V14 from the output voltage V13 of a DC voltage by turning on and off the four transistors. In this conventional case, the output voltage V14 from the driving circuit 14 is a high frequency voltage of 80 Vpp.

The sounding body 15 is a siren including a ceramic oscillator. When the output voltage V14 is applied to the sounding body 15, the sounding body 15 produces an alarm sound.

With the above configuration, the conventional vehicle burglar alarm circuit can produce an alarm sound having the same sound pressure level from the sounding body 15 regardless of the presence of the main battery 11.

The DC/DC converter 13 of the conventional vehicle burglar alarm circuit outputs the output voltage V13 having a predetermined value by varying a boosting ratio even though the main battery 11 and the internal battery 12 output different voltages. Accordingly, the DC/DC converter 13 requires a component for varying a boosting ratio, thereby complicating the circuit configuration.

Further, after the DC/DC converter 13 boosts the output voltage from the main battery 11 or the internal battery 12, the driving circuit 14 converts it into a high frequency voltage. Accordingly, it is necessary to install both the DC/DC converter 13 and the driving circuit 14, thereby increasing the number of parts and the cost.

SUMMARY OF THE INVENTION

In view of the above, the present invention provides a vehicle burglar alarm circuit having a simple circuit configuration, capable of generating an alarm sound having a sufficient sound pressure level even when it is driven by an internal battery.

In accordance with an embodiment of the present invention, there is provided a vehicle burglar alarm circuit including: a transformer which includes an input section having first to fourth taps and a center tap, wherein the number of turns of a coil between the first tap and the second tap is greater than the number of turns of a coil between the third tap and the fourth tap, and the center tap is provided at a center point of the coil between the first tap and the second tap and the coil between the third tap and the fourth tap, and an output section magnetically coupled with the input section and connected with a sounding body; a first power source, configured to be attachable and detachable, including one electrode connected to the center tap to output a first DC voltage; and a second power source including one electrode connected to the center tap to output a second DC voltage which is lower than the first DC voltage.

The vehicle burglar alarm circuit further includes a sounding body driving unit which includes a first driving switch having one terminal connected to the first tap of the transformer and another terminal connected to the other electrode of the first power source, a second driving switch having one terminal connected to the second tap of the transformer and another terminal connected to the other electrode of the first power source, a third driving switch having one terminal connected to the third tap of the transformer and another terminal connected to the other electrode of the second power source, and a fourth driving switch having one terminal connected to the fourth tap of the transformer and another terminal connected to the other electrode of the second power source; a power source selection unit which selects one of the first power source and the second power source as a power source that supplies a power to the transformer; and a controller which controls on and off of the first to fourth driving switches of the sounding body driving unit.

If the first power source is selected, the controller alternately turns on and off the first and the second driving switch, and turns off the third and the fourth driving switch to supply a power from the first power source to the sounding body. If the second power source is selected, the controller alternately turns on and off the third and the fourth driving switch, and turns off the first and the second driving switch to supply a power from the second power source to the sounding body.

Further, the power source selection unit may include a first power switch which includes a semiconductor device and provided at an output terminal of the first power source to turn on and off a power supplied from the first power source to the transformer, and a second power switch which turns on and off a power supplied from the second power source to the transformer. A first reverse current blocking member may be connected in series to the output terminal of the first power switch to prevent a current from flowing toward the output terminal of the first power switch Further, a second reverse current blocking member may be provided between the first driving switch and the first tap to prevent a current from flowing from the first driving switch toward the first tap, and a third reverse current blocking member may be provided between the second driving switch and the second tap to prevent a current from flowing from the second driving switch toward the second tap.

Further, a fourth reverse current blocking member may be provided at an output terminal of the second power source to prevent a current from flowing toward the output terminal of the second power source.

The vehicle burglar alarm circuit described above further includes a charging circuit which charges the second power source by using the first power source. Further, a fifth reverse current blocking member may be connected in series to an output terminal of the charging circuit to prevent a current from flowing from the second power source to the charging circuit.

Further, the transformer may be an autotransformer.

Further, the transformer may include a primary coil having the first to fourth taps and the center tap and a secondary coil connected to the sounding body.

As described above, the present invention offers an effect of providing a simple circuit configuration capable of generating an alarm sound having a sufficient sound pressure level even when it is driven by an internal battery.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described with reference to the accompanying drawings which form a part hereof.

Figure 1:
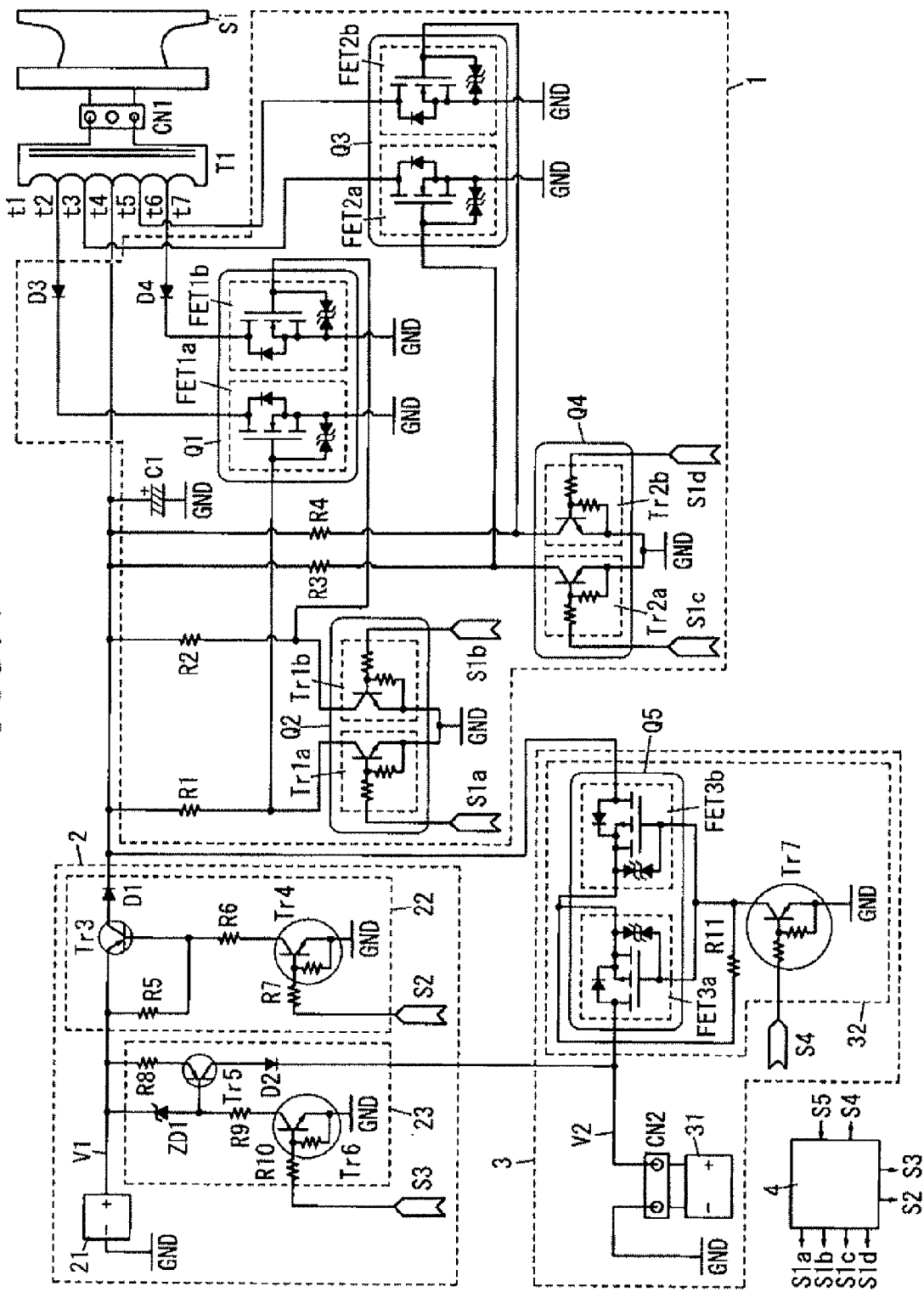
FIG. 1 illustrates a schematic configuration of a vehicle burglar alarm circuit in accordance with an embodiment of the present invention.

FIG. 1 illustrates a configuration of a vehicle burglar alarm driving circuit in accordance with a first embodiment of the present invention. The vehicle burglar alarm circuit includes a transformer T1, a sounding body driving unit 1, a vehicle battery unit 2, an internal battery unit 3, and a controller 4.

A configuration of the transformer T1 will be described. The transformer T1 is configured as an autotransformer. An output section of the transformer T1 is connected to a siren Si (sounding body) including a piezoelectric ceramic plate (vibrating ceramic plate), a dynamic speaker or the like. The transformer T1 includes taps t1 to t7 sequentially provided from an end of a coil. The taps t2 to t6 form an input section while the taps t1 and t7 form the output section. The taps t1 and t7 are provided at both ends of the coil, and the tap t4 (center tap) is provided at a center point of the transformer T1. Further, the tap t2 (first tap) and the tap t3 (third tap) are provided between the tap t1 and the tap t4 while the tap t5 (fourth tap) and the tap t6 (second tap) are provided between the tap t4 and the tap t7. The number of coil turns between the tap t2 and the tap t4 is equal to the number of coil turns between the tap t4 and the tap t6 while the number of coil turns between the tap t3 and the tap t4 is equal to the number of coil turns between the tap t4 and the tap t5. Further, the number of coil turns between the tap t2 and the tap t4 and between the tap t4 and the tap t6 is greater than the number of coil turns between the tap t3 and the tap t4 and between the tap t4 and the tap t5. The taps t1 and t7 are connected to the siren Si through a connecter CN1. Further, the tap t4 is positioned at a center point of the transformer T1, and is connected to the vehicle battery unit 2 and the internal battery unit 3. Moreover, the taps t2, t3, t5 and t6 are connected to the sounding body driving unit 1.

Next, a configuration of the sounding body driving unit 1 will be described. The sounding body driving unit 1 includes switching elements Q1 to Q4, resistors R1 to R4, a capacitor C1 and diodes D3 and D4. Further, the sounding body driving unit 1 and the transformer T1 form a push-pull circuit. The switching element Q1 is a complex package including two N-channel metal-oxide-semiconductor field-effect transistors (MOSFETs) FET1a and FET1b that are a first driving switch and a second driving switch, respectively. Further, each of the MOSFETs FET1a and FET1b includes a parasitic diode provided between the drain and the source; and a gate protection diode provided between the gate and the source. Further, the switching element Q3 is the same element as the switching element Q1 and includes MOSFETs FET2a and FET2b that are a third driving switch and a fourth driving switch, respectively.

Further, the switching element Q2 is a complex package including two NPN type transistors Tr1a and Tr1b. Further, each of the transistors Tr1a and Tr1b includes a bias resistor provided at an input terminal of the base and a bias resistor provided between the base and the emitter. Further, the switching element Q4 is the same element as the switching element Q2 and includes transistors Tr2a and Tr2b.

The MOSFET FET1a has the drain connected to the tap t2 via a diode D3, the gate connected to a connection node between the resistor R1 and the collector of the transistor Tr1a, and the source connected to a ground GND. The MOSFET FET1b has the drain connected to the tap t6 via a diode D4, the gate connected to a connection node between the resistor R2 and the collector of the transistor Tr1b, and the source connected to the ground GND. The diode D3 has the anode connected to the tap t2 and the cathode connected to the drain of the MOSFET FET1a. The diode D4 has the anode connected to the tap t6 and the cathode connected to the drain of the MOSFET FET1b. Further, the transistor Tr1a has the collector connected to the tap t4 via the resistor R1, the emitter connected to the ground GND, and the base to which a driving signal S1a is inputted. The transistor Tr1b has the collector connected to the tap t4 via the resistor R2, the emitter connected to the ground GND, and the base to which a driving signal S1b is inputted.

Further, the MOSFET FET2a has the drain connected to the tap t3, the gate connected to a connection node between the resistor R3 and the collector of the transistor Tr2a, and the source connected to the ground GND. The MOSFET FET2b has the drain connected to the tap t5, the gate connected to a connection node between the resistor R4 and the collector of the transistor Tr2b, and the source connected to the ground GND. Further, the transistor Tr2a has the collector connected to the tap t4 via the resistor R3, the emitter connected to the ground GND, and the base to which a driving signal S1c is inputted. The transistor Tr2b has the collector connected to the tap t4 via the resistor R4, the emitter connected to the ground GND, and the base to which a driving signal S1d is inputted.

Further, the capacitor C1 is configured as an electrolytic capacitor and provided between the tap t4 of the transformer T1 and the ground GND.

Next, a configuration of the vehicle battery unit 2 will be described. The vehicle battery unit 2 includes an attachable and detachable main battery (vehicle battery) 21, a switch unit 22 and a charging unit 23.

The main battery (first power source) 21 is loaded in a vehicle and is configured as a lead accumulator. An output voltage V1 from the main battery 21 is a DC voltage of 12V. A positive electrode of the main battery 21 is connected to the switch unit 22 and the charging unit 23 while a negative electrode thereof is connected to the ground GND.

The switch unit 22 includes transistors Tr3 and Tr4, resistors R5 to R7, and a diode D1 (first reverse current blocking member). The transistor Tr3 (first power switch) is a PNP-type transistor, and the transistor Tr4 is an NPN-type transistor having a bias resistor between the base and the emitter thereof. The transistor Tr3 has the emitter connected to the main battery 21, the collector connected to the anode of the diode D1, and the base connected to a collector of the transistor Tr4 via the resistor R6. Further, the resistor R5 is provided between the emitter and the base of the transistor Tr3. Further, the transistor Tr4 has the emitter connected to the ground GND, and the base to which a battery control signal S2 is inputted through the resistor R7. Further, the cathode of the diode D1 is connected to the tap t4 of the transformer T1.

The charging unit (charging circuit) 23 includes transistors Tr5 and Tr6, resistors R8 to RIO, a Zener diode ZD1 and a diode D2. The transistor Tr5 is a PNP-type transistor, and the transistor Tr6 is an NPN-type transistor having a bias resistor between the base and the emitter thereof. The transistor Tr6 has the collector connected to the resistor R9, the emitter connected to the ground GND, and the base to which a charging control signal S3 is inputted through the resistor R10. Further, the Zener diode ZD1 has the anode connected to the resistor R9 and the cathode connected to the main battery 21. The transistor Try has the emitter connected to the main battery 21 via the resistor R8, the base connected to a connection node between the Zener diode ZD1 and the resistor R9, and the collector connected to the anode of the diode D2. Further, the cathode of the diode D2 is connected to a positive electrode of an internal battery 31 for backup via a connector CN2.

Next, a configuration of the internal battery unit 3 will be described. The internal battery unit 3 includes the internal battery 31 and a switch unit 32.

A secondary battery such as a Ni-MH battery or a primary battery such as a lithium battery serves as the internal battery (second power source) 31. The internal battery 31 outputs a DC Voltage ranging from 4.8 V to 6.0 V. In the present embodiment, the internal battery 31 includes five Ni-MH batteries of 1.2 V, so that an output voltage V2 of the internal battery 31 is a DC voltage of 6.0 V. Further, a positive electrode of the internal battery 31 is connected to the switch unit 32 via the connector CN2 and a negative electrode thereof is connected to the ground GND via the connector CN2.

The switch unit 32 includes a switching element (second power switch) Q5, an NPN-type transistor Tr7 and a resistor R11. The switching element Q5 is a complex package including two P-channel MOSFETs FET3a and FET3b. The MOSFET FET3a has the drain connected to the internal battery 31, the source connected to the source of the MOSFET FET3b, and the gate connected to the collector of the transistor Tr7. Further, MOSFET FET3b has the drain connected to the tap t4 of the transformer T1, and the gate connected to the collector of the transistor Tr7. Further, the MOSFETs FET3a and FET3b have the resistor R11 connected between their sources and gates. Further, each of the MOSFETs FET3a and FET3b includes a parasitic diode provided between the drain and the source and a gate protection diode provided between the gate and the source.

Further, the transistor Tr7 includes a bias resistor provided at an input terminal of the base and a bias resistor provided between the base and the emitter. The transistor Tr7 has the emitter connected to the ground GND, and the base to which an internal battery control signal S4 is inputted through the bias resistor.

Next, a configuration of the controller 4 will be described. The controller 4 is driven by the output voltage V2 from the internal battery 31 connected thereto. The controller 4 outputs driving signals S1a to S1d to the sounding body driving unit 1 to thereby control on/off of the MOSFETs FET1a, FET1b, FET2a and FET2b. Further, the switch units 22 and 32 form a power source selection unit. The controller 4 outputs a battery control signal S2 to the switch unit 22, outputs a charging signal S3 to the charging unit 23, and outputs the internal battery control signal S4 to the switch unit 32. Further, the controller 4 turns on either the switch unit 22 or the switch unit 32, so that an electric power is supplied from either the main battery 21 or the internal battery 31 to the transformer T1. Further, the controller 4 detects the output voltage V1 from the main battery 21 and the output voltage V2 from the internal battery 31. Further, the controller 4 receives an alarm signal S5 containing the information on whether an abnormality is detected from an abnormality detector (not shown) provided in a vehicle burglar alarm device.

Next, an operation of the vehicle burglar alarm circuit in accordance with the embodiment of the present invention will be described.

First, a case where the siren Si is driven by using the main battery 21 will be explained. The controller 4 detects the output voltage V1 from the main battery 21. Then, if the output voltage V1 is equal to or greater than a predetermined value, it is determined that the main battery 21 is present. Then, the controller 4 outputs the battery control signal S2 of a high level to the switch unit 22. If the battery control signal S2 of a high level is inputted to the base of the transistor Tr4 of the switch unit 22, the transistor Tr4 is turned on and the transistor Tr1 is turned on. Accordingly, the main battery 21 is electrically connected to the tap t4 of the transformer T1 through the diode D1. Consequently, an electric power is supplied from the main battery 21 to the transformer T1.

Further, the controller 4 outputs the internal battery control signal S4 of a low level to the switch unit 32. If the internal battery control signal S4 of a low level is inputted to the base of the transistor Tr7 of the switch unit 32, the transistor Tr7 is turned off and the MOSFETs FET3a and FET3b are turned off. Accordingly, the internal battery 31 is disconnected from the tap t4 of the transformer T1 such that an electric power is not supplied from the internal battery 31 to the transformer T1.

If the vehicle burglar alarm device detects an abnormality, the alarm signal S5 of a high level is outputted from the abnormality detector (not shown) to the controller 4. If the alarm signal S5 of a high level is inputted to the controller 4 while the controller 4 outputs the battery control signal S2 of a high level, the controller 4 outputs the driving signals S1a and S1b alternately having a high level and a low level to the sounding body driving unit 1. Further, the controller 4 outputs the driving signals S1c and S1d each having a low level to the sounding body driving unit 1.

If the driving signals S1a and S1b each having a high level are outputted to the switching element Q2, the transistors Tr1a and Tr1b are turned on and the MOSFETs FET1a and FET1b of the switching element Q1 are turned on. Accordingly, the taps t2 and t6 of the transformer T1 are short-circuited to the ground GND. Further, if the driving signals S1a and S1b each having a low level are outputted to the switching element Q2, the transistors Tr1a and Tr1b are turned off and the switching element Q1 is turned off. Accordingly, the taps t2 and t6 are disconnected from the ground GND.

Accordingly, the controller 4 outputs the driving signals S1a and S1b alternately having a high level and a low level, thereby alternately turning on and off the MOSFETs FET1a and FET1b. Consequently, a current flows alternately between the taps t2 and t4 and between the taps t4 and t6 of the transformer T1. As described above, siren driving power is generated between the taps t1 and t7 by using the sounding body driving unit 1 configured as a push-pull circuit, wherein the output voltage V1 applied from the main battery 21 to the tap t4 of the transformer T1 is boosted and converted. The siren driving power is supplied to the siren Si connected through the connecter CN1, so that the siren Si produces an alarm sound.

Further, since the driving signals S1c and S1d each having a low level are inputted to the switching element Q4, the transistors Tr2a and Tr2b and the MOSFETs FET2a and FET2b are turned off. Accordingly, the taps t3 and t5 are disconnected from the ground GND.

Further, if the vehicle burglar alarm device does not detect an abnormality, the alarm signal S5 of a low level is outputted from the abnormality detector (not shown) to the controller 4. If the alarm signal S5 of a low level is inputted to the controller 4, the controller 4 outputs the battery control signal 52 of a low level to the switch unit 22, and outputs the driving signals S1a to S1d each having a low level to the sounding body driving unit 1. Accordingly, since the MOSFETs FET1a, FET1b, FET2a and FET2b are turned off, a current does not flow in the transformer T1 and the siren Si does not produces an alarm sound.

Further, the controller 4 detects the output voltage V2 of the internal battery 31. If the output voltage V2 is equal to or smaller than a predetermined value, the controller 4 outputs the charging signal S3 of a high level to the charging unit 23. If the charging signal S3 of a high level is inputted to the base of the transistor Tr6, the transistor Tr6 is turned on and the transistor Tr5 is turned on. As the transistor Tr5 is turned on, the output voltage V1 of the main battery 21 is applied to the positive electrode of the internal battery 31 through the resistor R8 and the diode D2. Then, the internal battery 31 is charged.

When the internal battery 31 is charged such that the output voltage V2 is equal to or greater than a predetermined value, the controller 4 outputs the charging signal S3 of a low level to the charging unit 23. If the charging signal S3 of a low level is inputted to the base of the transistor Tr6, the transistor Tr6 is turned off and the transistor Tr5 is turned off. Accordingly, the electric power supplied from the main battery 21 to the internal battery 31 is stopped. Further, since the diode D2 (fifth reverse current blocking member) is provided at an output terminal of the charging unit 23 to restrict a current flow direction. Accordingly, the diode D2 blocks current passing from the internal battery 31 to the charging unit 23, so that it is possible to prevent the transistor Tr5 from being damaged by a reverse voltage from the internal battery 31.

Next, a case where the siren Si is driven by using the internal battery 31 will be explained. The vehicle burglar alarm circuit of the present embodiment employs the internal battery 31 to drive the siren Si if the main battery 21 is not present. For example, a burglar may separate the main battery 21 from the vehicle in order to stop an operation of the vehicle burglar alarm device and an alarm sound.

First, the controller 4 detects the output voltage V1 of the main battery 21. If the output voltage V1 is equal to or smaller than a predetermined value, the controller 4 determines that the main battery 21 is not present. Then, the controller 4 outputs the internal battery control signal S4 of a high level to the switch unit 32. If the internal battery control signal S4 of the high level is inputted to the base of the transistor Tr7, the transistor Tr7 is turned on and the MOSFETs FET3a and FET3b of the switching element Q5 are turned on. Accordingly, the internal battery 31 is electrically connected to the tap t4 of the transformer T1. Consequently, an electric power is supplied from the internal battery 31 to the transformer T1.

Further, the controller 4 outputs the battery control signal S2 of a low level to the switch unit 22.

If the battery control signal S2 of a low level is inputted to the base of the transistor Tr4 of the switch unit 22, the transistor Tr4 is turned off and the transistor Tr3 is turned off. Accordingly, the main battery 21 is disconnected from the tap t4 of the transformer T1 and, at the same time, the controller 4 outputs the internal battery control signal S4 of a high level and outputs the driving signals S1c and S1d alternately having a high level and a low level to the sounding body driving unit 1. Further, the controller 4 outputs the driving signals S1a and S1b each having a low level to the sounding body driving unit 1.

If the driving signals S1c and S1d each having a high level are outputted to the switching element Q4, the transistors Tr2a and Tr2b are turned on and the MOSFETs FET2a and FET2b of the switching element Q3 are turned on. Accordingly, the taps t3 and t5 of the transformer T1 are short-circuited to the ground GND. Further, if the driving signals S1c and S1d each having a low level are outputted to the switching element Q4, the transistors Tr2a and Tr2b are turned off and the switching element Q3 is turned off. Accordingly, the taps t3 and t5 are disconnected from the ground GND.

Accordingly, the controller 4 outputs the driving signals S1c and S1d alternately having a high level and a low level, thereby alternately turning on and off the MOSFETs FET2a and FET2b. Consequently, a current flows alternately between the taps t3 and t4 and between the taps t4 and t5 of the transformer T1. As described above, siren driving power is generated between the taps t1 and t7 by using the sounding body driving unit 1 configured as a push-pull circuit, wherein the output voltage V2 applied from the internal battery 31 to the tap t4 of the transformer T1 is boosted and converted. The siren driving power is supplied to the siren Si connected through the connector CN1, so that the siren Si produces an alarm sound.

Further, since the driving signals S1a and S1b of a low level are inputted to the switching element Q2, the transistors Tr1a and Tr1b and the MOSFETs FET1a and FET1b are turned off. Accordingly, the taps t2 and t4 are disconnected from the ground GND.

As described above, if the output voltage V1 of the main battery 21 is equal to or smaller than the predetermined value, the power source is changed to the internal battery 31 and the siren Si produces an alarm sound.

In case where the main battery 21 is separated from the vehicle, the transistor Tr3 may be damaged if the output voltage V2 (reverse voltage) of the internal battery 31 is applied to the collector of the PNP-type transistor Tr3 provided in the switch unit 22 of the vehicle battery unit 2.

However, in the present embodiment, the diode D1 (first reverse current blocking member) is provided at an output terminal of the car battery unit 2. The diode D1 has the anode connected to the collector of the transistor Tr3 and the cathode connected to the drain of the MOSFET FET3b. Accordingly, the output voltage V2 of the internal battery 31 is not applied to the collector of the transistor Tr3.

Further, when the siren Si produces an alarm sound by using the internal battery 31, the MOSFETs FET2a and FET2b are alternately turned on and off and a current flows in the transformer T1. In this case, if the MOSFET FET2a is in an on state and the MOSFET FET2b is in an off state, the output voltage V2 is applied between the taps t3 and t4.

Suppose the number of coil turns between the taps t3 and t4 be n1, and the number of coil turns between the taps t2 and t4 be n2. A voltage V3 generated between the taps t2 and t4 is given as n2×V2/n1. In the present embodiment, a relationship between n1 and n2 is set to be n2/n1≈V1/V2. Accordingly, the voltage V3 generated between the taps t2 and t4 is given as n2×V2/n1=(12V/6V)×6V=12V. In this case, a drain-source voltage Vds of the MOSFET FET1a is given as −(V3−V2)=−(12V−6V)=−6V. That is, in a driving operation using the internal battery 31, when the MOSFET FET2a is turned on, a reverse voltage of −6V is generated between the drain and the source of the MOSFET FET1a. Similarly, when the MOSFET FET2b is turned on, a reverse voltage of −6V is generated between the drain and the source of the MOSFET FET1b. The reverse voltage causes electrical connection through the diode in the MOSFET FET1a or FET1b.

However, in the present embodiment, the diode D3 (second reverse current blocking member) is provided between the MOSFET FET1a and the tap t2, and diode D4 (third reverse current blocking member) is provided between the MOSFET FET1b and the tap t6. The diode D3 has the anode connected to the tap t2, and the cathode connected to the drain of the MOSFET FET1a. The diode D4 has the anode connected to the tap t6, and the cathode connected to the drain of the MOSFET FET1b. Accordingly, it is possible to prevent the reverse voltage from being applied to the MOSFETs FET1a and FET1b.

Further, a current may flow from the main battery 21 to the internal battery 31 since the output voltage V1 (12V) of the main battery 21 is higher than the output voltage V2 (6V) of the internal battery 31. However, the switch unit includes the switching element Q5 as a reverse current blocking member (fourth reverse current blocking member). Specifically, the switching element Q5, i.e., the MOSFETs FET3a and FET3b, is connected in series between the internal battery 31 and the diode D1. Since the drain of the MOSFET FET3b is connected to the diode D1, the output voltage V1 is applied to the MOSFET FET3a through the parasitic diode of the MOSFET FET3b. However, when the main battery 21 is attached to the vehicle, the MOSFET FET3a is in an off state. Accordingly, the current flow to the drain from the source of the MOSFET FET3a is blocked, and therefore, the output voltage V1 is not applied to the internal battery 31.

Further, the vehicle burglar alarm circuit of the present embodiment changes taps to be used depending on which power source is used to drive the siren Si. In a case where the siren Si is driven by the main battery 21, the MOSFETs FET1a and FET1b are turned on and off, and a current flows between the taps t2 and t4 and between the taps t4 and t6.

Further, in a case where the siren Si is driven by the internal battery 31, the MOSFETs FET2a and FET2b are turned on and off, and a current flows between the taps t3 and t4 and between the taps t4 and t5. The number of coil turns between the taps t3 and t4 and between the taps t4 and t5 used when the siren Si is driven by the internal battery 31 is smaller than the number of coil turns between the taps t2 and t4 and between the taps t4 and t6 used when the siren Si is driven by the main battery 21. Accordingly, the voltage applied to the tap t4 of the transformer T1 is boosted more when using the internal battery 31 than when using the main battery 21. Consequently, even though the siren Si is driven by using the internal battery 31 having the output voltage V2 (6V) which is lower than the output voltage V1 (12V) of the main battery 21, it is possible to generate an alarm sound having a sufficient sound pressure level.

Further, in the present embodiment, a relationship between the number n2 of coil turns between the taps t2 and t4 and between the taps t4 and t6; and the number n1 of coil turns between the taps t3 and t4 and between the taps t4 and t5 is set to be n2/n1≈V1/V2. Accordingly, an alarm sound having substantially the same sound pressure level can be generated when the siren Si is driven by the main battery 21 and when the siren Si is driven by the internal battery 31.

Further, the conventional vehicle burglar alarm circuit employs the flyback type DC/DC converter 13 to boost the output voltage of the main battery 11 and the internal battery 12. Since the flyback type DC/DC converter 13 is not appropriate for outputting a large power, there is a problem such that the sound pressure level of the sounding body 15 becomes small. Further, since the DC/DC converter converts different input voltages into a predetermined output voltage V13 by varying a boosting (step-up) ratio, the circuit configuration becomes complicated.

However, in the present embodiment, the sounding body driving unit 1 and the transformer T1 form the push-pull circuit. The sounding body driving unit 1 alternately turns on and off the MOSFETs FET1a and FET1b or the MOSFETs FET2a and FET2b to boost a DC voltage applied to the tap t4 of the transformer T1 and convert it into a high frequency power, so that the high frequency power is supplied to the siren Si. Accordingly, it is possible to supply a larger electric power to the siren Si and increase a sound pressure level compared to the flyback type DC/DC converter 13. Consequently, it is possible to increase the alarm sound generated from the siren Si.

Further, since the push-pull circuit including the sounding body driving unit 1 and the transformer T1 is used to boost and convert the DC voltage into a high frequency power, unlike the conventional case, there is no need to install both the DC/DC converter 13 and the driving circuit 14. Thus, it is possible to reduce the number of parts and the cost.

Further, the transformer T1 of the present embodiment is configured as an autotransformer. Accordingly, the transformer T1 includes primary and secondary coils sharing a part with each other. Accordingly, it is possible to reduce the number of turns of the coil of the transformer T1 and the size of the transformer T1.

Figure 2:
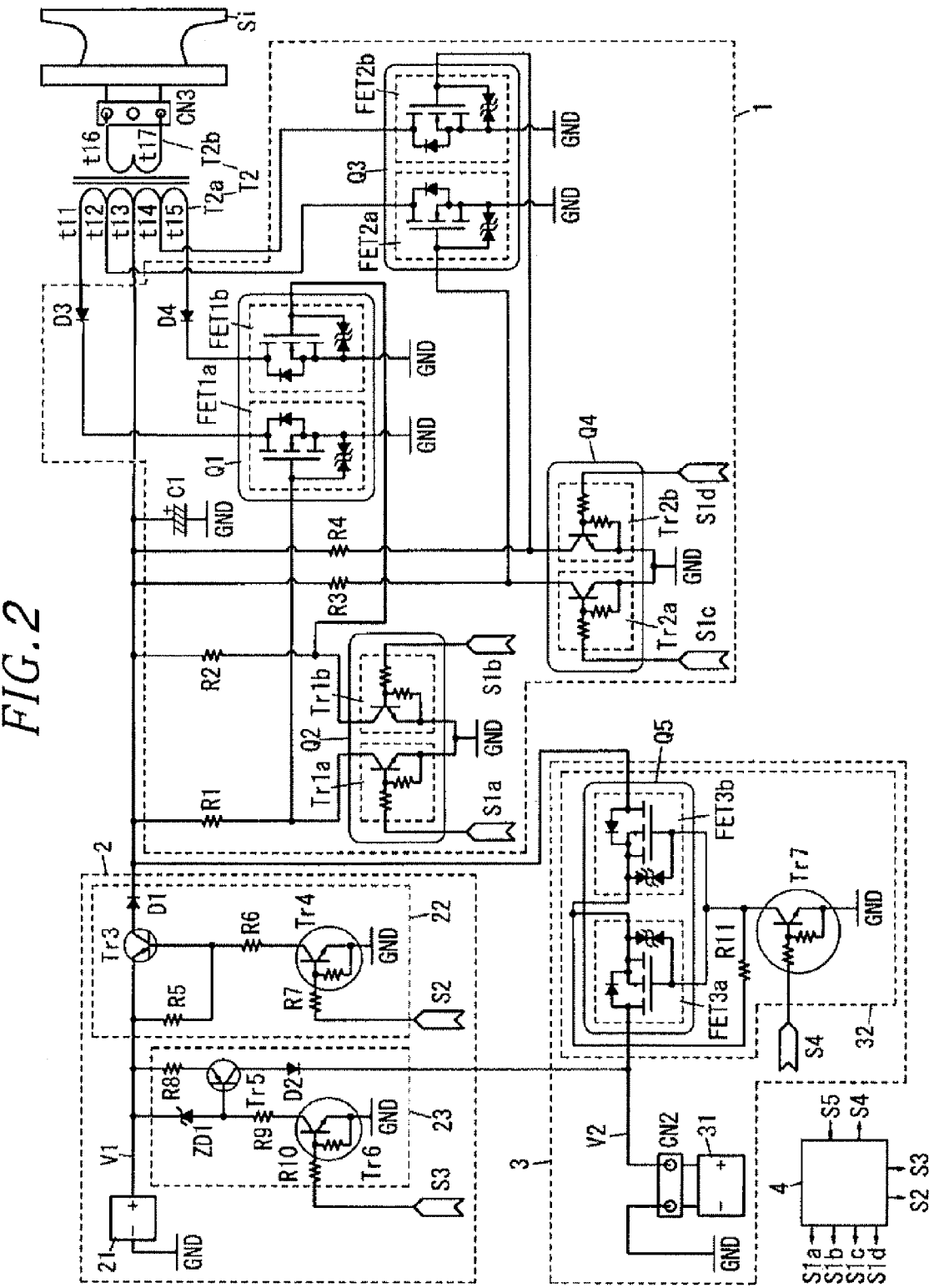
FIG. 2 illustrates a schematic configuration of a vehicle burglar alarm circuit in accordance with a modification of the present invention.
Figure 3:
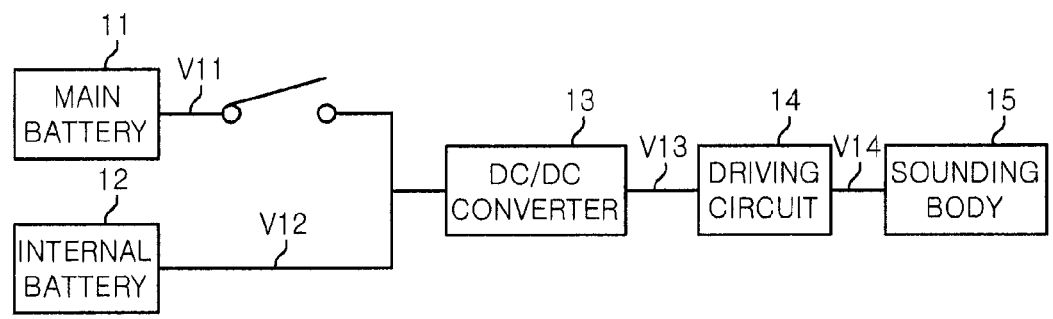
FIG. 3 is a block diagram of a conventional vehicle burglar alarm circuit.

However, the siren Si may be driven by a transformer T2 having a secondary coil. FIG. 2 illustrates a configuration of a vehicle burglar alarm circuit including the transformer T2.

The transformer T2 includes a primary coil T2a and a second coil T2b. The primary coil T2a includes taps t11 to t15 sequentially provided from an end of the coil, which form an input section. The taps t11 and t15 are provided at both ends of the coil, and the tap t13 is provided at a center point of the coil. Further, the number of coil turns between the tap t12 and the tap t13 is equal to the number of coil turns between the tap t13 and the tap t14. The tap t13 is a center point of the primary coil T2a, and is connected to the vehicle battery unit 2 and the internal battery unit 3. Further, the tap t11 is connected to the MOSFET FET1a through the diode D3 and the tap t15 is connected to the MOSFET FET1b through the diode D4. Furthermore, the tap t12 is connected to the MOSFET FET2a and the tap t14 is connected to the MOSFET FET2b.

Further, the second coil T2b includes taps t16 and t17, which form an output section. The taps t16 and t17 are provided at both ends of the second coil T2b and connected to the siren Si through a connector CN3.

The other configuration is the same as that of the vehicle burglar alarm circuit having the transformer T1 which has been described with reference to FIG. 1. Accordingly, the like reference numerals will be given to the like parts and the description thereof will be omitted.

The number of coil turns between the taps t12 and t13 and between the taps t13 and t14 used when the siren Si is driven by the internal battery 31 is smaller than the number of coil turns between the taps t12 and t13 and between the taps t13 and t14 used when the siren Si is driven by the main battery 21. Accordingly, the voltage applied to the tap t13 of the transformer T2 is boosted more when using the internal battery 31 than when using the main battery 21. Consequently, even though the siren Si is driven by using the internal battery 31 having the output voltage V2 (GV) which is lower than the output voltage V1 (12V) of the main battery 21, it is possible to generate an alarm sound having a sufficient sound pressure level.

Further, in the transformer T2, the primary coil T2a is insulated from the second coil T2b. Accordingly, even though a surge voltage or noise is generated in the primary coil T2a, it is not transmitted to the siren Si. Therefore, it is possible to protect the siren Si.

While the invention has been shown and described with respect to the embodiments, it will be understood by those skilled in the art that various changes and modification may be made without departing from the scope of the invention as defined in the following claims.

What is claimed is:

1. A vehicle burglar alarm circuit comprising:
   a transformer which includes an input section having first to fourth taps and a center tap, wherein the number of turns of a coil between the first tap and the second tap is greater than the number of turns of a coil between the third tap and the fourth tap, and the center tap is provided at a center point of the coil between the first tap and the second tap and the coil between the third tap and the fourth tap, and an output section magnetically coupled with the input section and connected with a sounding body;
   a first power source, configured to be attachable and detachable, including one electrode connected to the center tap to output a first DC voltage;
   a second power source including one electrode connected to the center tap to output a second DC voltage which is lower than the first DC voltage;
   a sounding body driving unit which includes a first driving switch having one terminal connected to the first tap of the transformer and another terminal connected to the other electrode of the first power source, a second driving switch having one terminal connected to the second tap of the transformer and another terminal connected to the other electrode of the first power source, a third driving switch having one terminal connected to the third tap of the transformer and another terminal connected to the other electrode of the second power source, and a fourth driving switch having one terminal connected to the fourth tap of the transformer and another terminal connected to the other electrode of the second power source;
   a power source selection unit which selects one of the first power source and the second power source as a power source that supplies a power to the transformer; and
   a controller which controls on and off of the first to fourth driving switches of the sounding body driving unit,
   wherein, if the first power source is selected, the controller alternately turns on and off the first and the second driving switch, and turns off the third and the fourth driving switch to supply a power from the first power source to the sounding body; and
   wherein, if the second power source is selected, the controller alternately turns on and off the third and the fourth driving switch, and turns off the first and the second driving switch to supply a power from the second power source to the sounding body.

2. The vehicle burglar alarm circuit of claim 1, wherein the power source selection unit includes a first power switch which includes a semiconductor device and provided at an output terminal of the first power source to turn on and off a power supplied from the first power source to the transformer, and a second power switch which turns on and off a power supplied from the second power source to the transformer, and
   a reverse current blocking member is connected in series to the output terminal of the first power switch to prevent a current from flowing toward the output terminal of the first power switch.

3. The vehicle burglar alarm circuit of claim 1, wherein a reverse current blocking member is provided between the first driving switch and the first tap to prevent a current from flowing from the first driving switch toward the first tap, and another reverse current blocking member is provided between the second driving switch and the second tap to prevent a current from flowing from the second driving switch toward the second tap.

4. The vehicle burglar alarm circuit of claim 1, wherein a reverse current blocking member is provided at an output terminal of the second power source to prevent a current from flowing toward the output terminal of the second power source.

5. The vehicle burglar alarm circuit of claim 1, further comprising a charging circuit which charges the second power source by using the first power source, wherein a reverse current blocking member is connected in series to an output terminal of the charging circuit to prevent a current from flowing from the second power source to the charging circuit.

6. The vehicle burglar alarm circuit of claim 1, wherein the transformer is an autotransformer.

7. The vehicle burglar alarm circuit of claim 1, wherein the transformer includes a primary coil having the first to fourth taps and the center tap and a secondary coil connected to the sounding body.

* * * * *